United States Patent [19]

McSweeney

[11] 4,384,005

[45] May 17, 1983

[54] NON-FRIABLE, READILY-SOLUBLE, COMPRESSED TABLETS AND PROCESS FOR PREPARING SAME

[75] Inventor: Daniel R. McSweeney, Willowbrook, Ill.

[73] Assignee: General Foods Corporation, White Plains, N.Y.

[21] Appl. No.: 269,435

[22] Filed: Jun. 2, 1981

Related U.S. Application Data

[63] Continuation-in-part of Ser. No. 191,810, Sep. 26, 1980, abandoned.

[51] Int. Cl.³ .................. B27J 5/00; A23L 2/00; A23L 1/275; A23L 1/236
[52] U.S. Cl. .................. 426/250; 426/285; 426/590; 426/548; 426/454; 426/650; 426/661; 264/124
[58] Field of Search .............. 426/590, 285, 453, 601, 426/548, 591, 442, 454, 465, 661, 250, 511, 650; 264/232, 124

[56] References Cited

U.S. PATENT DOCUMENTS

| | | | |
|---|---|---|---|
| 2,380,092 | 7/1945 | Weisberg | 426/454 |
| 2,851,361 | 9/1958 | Diller | 426/591 |
| 2,889,226 | 6/1959 | Hinkley | 426/548 |
| 3,627,583 | 12/1971 | Troy et al. | 426/285 |
| 3,653,914 | 4/1972 | Schmitt | 426/302 |
| 3,660,107 | 5/1972 | Mayer | 426/591 |
| 3,667,962 | 6/1972 | Fritzberg et al. | 426/591 |
| 4,004,036 | 1/1977 | Schmitt | 426/285 |
| 4,013,775 | 3/1977 | Nelson et al. | 426/285 |
| 4,031,238 | 6/1977 | Reid et al. | 426/285 |

Primary Examiner—Raymond N. Jones
Assistant Examiner—Elizabeth J. Curtin
Attorney, Agent, or Firm—Joyce P. Hill; Thomas R. Savoie; Jonathan B. Schafrann

[57] ABSTRACT

This invention relates to the problem of water-soluble tablets, wherein dry, edible ingredients having a substantially granular or crystalline structure are blended to form a dry mix which is contacted with an aqueous moistener comprising corn syrup and admixed to form a dough or cohesive powder. The moistened dough or cohesive powder is then mixed with a hydrolyzed starch material to form a flowable composition which can be suitably compressed to form a coherent tablet, using tableting pressures below 200 psig that has a tablet density of about 0.7 to 1.0 grams per cubic centimeter. Optionally, said tablet may be subsequently dried to a stable moisture content to improve storage shelf-life. The resulting tablet is tough, void-free, non-crumbly and rapidly soluble in water.

20 Claims, No Drawings

NON-FRIABLE, READILY-SOLUBLE, COMPRESSED TABLETS AND PROCESS FOR PREPARING SAME

This is a continuation-in-part of application Ser. No. 191,810, filed Sept. 26, 1980, now abandoned.

TECHNICAL FIELD

This invention relates to dry edible ingredients, and more particularly to a controlled portion form of dry edible ingredients and a process for producing it.

It is known to form controlled portions of dry materials by compressing the dry particulate material to form a coherent mass, such as a tablet or cube. As for the compressed tablet method, generally two techniques are employed; namely, the wet granulation method and the direct compression method. In the wet granulation method, powders of the main ingredients are added to a solution of suitable binders and the moistened mixture is agitated, granulated and dried to form granules. Then the granules are compressed into tablets. In the direct compression method, tablets are prepared by compressing dry materials, usually incorporating a binding agent, with sufficient pressure to form a tablet.

It is also well known that in order to form a water-soluble tablet of a given material, the wet granulation method is widely used to create a table-table material that possesses fluidity and compressibility. It is essential that the material flow uniformly from the hopper to the dies of the tablet press. Any defect in flow of the material will affect the weight of the tablets, content, uniformity disintegration time, hardness, friablity, and also the bio-availability of the active ingredients.

The direct compression method for tableting offers several advantages from the standpoint of processing procedures, equipment and materials. However, most dry materials have poor compaction properties and cannot be directly compressed alone in dry form to produce a coherent mass. Therefore, binding agents or excipient materials are usually needed to surround the dry powdered ingredients to impart fluidity and compressibility. The binder must also be compatible with the active ingredients and should not delay the disintegration properties of the materials in water nor delay the bio-availability of the therapeutic substances. Thus, it can be seen that the direct compression method has limitations based on the rather critical function of a binding agent.

In addition to the limitations of the direct compression or wet granulation tableting operations mentioned above, the degree of compression, a processing parameter common to both tableting methods, can also affect the rate at which the water-soluble tablet dissolves in water. Past practices, have failed to produce a compressed tablet that is hard enough and sufficiently strong to sustain shocks during shipping and handling that also has a very rapid disintegration rate in water. Thus, there is a continued search for an improved process for tableting compositions which are rapidly disintegrative and resistant to breakage and crumbling.

The need for a nonfriable, rapidly water soluble tablet can be easily illustrated with the state of the art in the beverage industry.

Premixed dry beverage ingredients enjoy wide commercial use because they offer convenience, economy, and good taste. These compositions are currently available in both pre-sweetened and unsweetened forms and are typically packaged as powders. Dry beverage compositions in powder form can be packaged in sizes convenient for preparing a single serving or a particular-sized container of beverage; however, powders tend to be messy, and it would be desirable to have a unitary form which prevents spillage of material.

There have been prior attempts to prepare dry beverage compositions in the form of tablets; however, these tablets are typically either poorly soluble in cold water or lack the proper structural strength to maintain the integrity during normal conditions of shipping and handling. Therefore, it would be desirable to have a unitary dry beverage composition in the form of a rapidly water-soluble, yet structurally-strong tablet.

BACKGROUND ART

The prior art has provided a number of procedures for preparing dry beverage tablets. In U.S. Pat. No. 2,889,226 to Hinkley and U.S. Pat. No. 3,660,107 to Mayer, effervescent couples are added to tableted dry beverage mixes to improve the rate of solubility of the highly compressed tablets. Hinkley employs a wetting agent in addition to the effervescent materials.

While not directly related to the preparation of beverage tablets, U.S. Pat. Nos. 3,653,914 and 4,004,036 to Schmitt describe the preparation of rapidly-soluble sweetener tablets for use in hot or aqueous media. In preparing the tablets, a minor amount of water is added with an organic solvent to release a portion of the $CO_2$ from an effervescent couple which is employed to aid in dissolving the tablet. The release of $CO_2$ during molding is said to achieve a porous structure. U.S. Pat. No. 4,004,036 indicates that the tablet is weaker than would be desired but can be strengthened by contacting the formed tablet with an organic solvent.

In U.S. Pat. No. 2,851,361 to Diller, there is disclosed a tablet for preparing a carbonated soft drink in cold water. It is indicated that the density of the tablet is a critical factor and should be about 1.3 grams per cubic centimeter. The patent discloses that because it is difficult to secure the desired high density, the tablet can be compressed while removing entrapped air. The patent further suggest that a lubricated die using a pressure of about 4,000 pounds per square inch, psig (281.2 kilograms per square centimeter, $Kg/cm^2$) is appropriate.

U.S. Pat. No. 3,667,962 to Fritzberg et al., indicates that the solubility of tablets for preparing carbonated beverages can be improved by forming separate acid and carbonate portions which are both highly porous and friable. In the paragraph bridging columns 3 and 4 of this patent, it is indicated that these puffed materials can be crushed to powdered form and then packaged. Thus, while Fritzberg et al disclose a way to improve solubility, they do so without concern for structural strength of the formed product.

In U.S. Pat. No. 4,031,238 to Reid et al., there is disclosed a water-soluble, solid beverage cube consisting of powdered glucose monohydrate, sucrose and a hydroscopic flavor material. According to the disclosure, this mixture is heated in a closed or moistened environment and then shaped to final form. This is said to be an improvement upon the disclosed prior art procedure of combining a flavor material with a vehicle such as ethyl alcohol and water to form a damp, non-cohesive powder which is then formed into a cube under pressure and dried to evaporate the vehicle.

Compressed tablets of moistened granular materials are disclosed in U.S. Pat. No. 4,013,775 of Nelson et al.

(sugar tablets), U.S. Pat. No. 3,627,583 of Troy et al. (sugar compositions), U.S. Pat. No. 2,380,092 of Weisburg (coffee product), to name a few.

There remains a present need for a unitary form of dry edible ingredients which is rapidly water-soluble, yet structurally-strong, and an economical, less energy-intensive process for preparing such a product.

DISCLOSURE OF INVENTION

In accordance with the present invention, there is provided an improved process for preparing a nonfriable, rapidly water-soluble, edible tablet. One embodiment of the tablet of this invention is prepared by compressing a moistened mixture of ingredients comprising an edible acidulent. The improvement disclosed herein comprises: blending the acidulent alone or with other dry ingredients such as disintegrants, flavorants, coloring agents, all in dry particulate form, to form a uniform dry mix; admixing an aqueous moistener comprising corn syrup with the dry blend to form a dough or cohesive powder; uniformly dispersing throughout the dough or cohesive powder, a dextrinized starch material having a DE value between 0.5 and 50, to produce a flowable composition having a moisture content in the range of 0.4 to 4.5 percent weight basis, compressing the flowable composition to the extent necessary to obtain a coherent tablet which has a tablet density of from 0.7 to 1.0 grams per cubic centimeter as measured on a tablet having a moisture content of less than about 1.5% by weight.

It is the object of this invention to provide a nonfriable, substantially void-free, rapidly water-soluble tablet of dry edible materials.

It is another object of this invention to prepare a non-friable, void-free, rapidly water-soluble tablet of a food acidulant.

It is another object of this invention to prepare dry, edible material in tablet form using a hybrid wet granulation-direct compression process which requires pressure of less than 200 psig for tableting.

It is a further object of this invention to prepare a dry, edible material in tablet form that clearly exhibits the commercially desirable balance of toughness and structural integrity while possessing the ability to completely disintegrate in an aqueous medium in less than one minute, with moderate stirring.

BEST MODE FOR CARRYING OUT THE INVENTION

The present invention is particularly described with respect to beverage ingredients, but it should be apparent to those skilled in the art that the teachings herein have other applications; for instance, to the preparation of tablets comprising dry ingredients having a substantially granular or crystalline structure having flowablility and compressability so that said ingredients can form self-sustaining tablets of low density which are rapidly soluble in an aqueous solution.

Dry ingredients useful in preparing delicious, refreshing beverages may include colorant, flavorant, edible acidulant and sweetener. The dry ingredients suitable for tableting can be individually or collectively compressed into tablets. For example, the edible acidulant can be tableted alone. The sweetener in the form of a particulate sugar can be tableted with or without colorant or flavorant. Color and flavor are normally used in minor amounts and are therefore usually combined with one of the major dry ingredients, such as the acidulant, sweetener or both.

In the preferred embodiment, the compositions prepared according to the present invention comprise colorant, flavor, and edible acidulent in the amounts effective to provide the desired taste and eye appeal. The beverage mix can comprise a sweetener such as sucrose, if desired, but this is not necessary as some consumers prefer to sweeten the beverage to their own tastes.

In its broad aspects, the process for preparing this dry beverage composition will comprise blending at least a portion of the sweetener, if a sweetener is used, with the acidulant and the colorant, all in dry particle form, to prepare a uniform dry mix. The dry mix may also, but preferably does not, contain the flavorant. The resulting dry mix is then admixed with an aqueous moistener comprising corn syrup to form a dough or cohesive powder.

The aqueous moistener supplies water and water-binders when forming the tabletable mix. As employed herein, the term "aqueous moistener" is meant to include a liquid solution comprising corn syrup.

Optionally, the "aqueous moistener" may include glycerine, glycerine derivatives or mixtures thereof. For the water-soluble tablet of a food acidulent, corn syrup is used in combination with glycerine to strengthen the final product. For the unsweetened tablet, corn syrup and glycerine, together with malto dextrin, are believed to impart the desired toughness and structural integrity.

Glycerine derivatives such as coconut oil may be substituted for glycerine if a less-hygroscopic product is desired. Other suitable glycerine derivatives are mono-, di- and tri-glycerides, diglyceryl tetra oleate and the like.

In addition to the aqueous moistener, the tabletable mixture of this invention also contains a melting point elevator. A melting point elevator can be any edible material which functions to raise the melting point of the tabletable mixture so that the tablet will not soften, melt or form a hard core during the optional drying step that follows tablet formation. Preferred melting point elevators are tapioca dextrin for the tablet sweetened with sucrose and malto dextrin for the unsweetened or synthetically-sweetened tablet.

Flavorant and other nutritional ingredients, such as ascorbic acid, suitable for the formation of a tabletable mixture are uniformly dispersed throughout the moistened dough or powder. The resulting tabletable mixture is compressed and dried, if necessary for storage stability.

As a colorant, there can be employed any of those materials which are typically employed in dry beverage mixes. The color is present in an amount effective to simulate the color normally associated with the particular flavor system employed. Thus, for example, where a root beer or cola flavor is employed, a colorant such as caramel which is capable of providing a brown coloration to the liquid will be employed. Similarly, where an orange, lemon or lime flavor is desired, the color will be selected from those capable of providing an orange, yellow, or green coloration respectively.

It is generally preferred that the beverage contains a sufficient amount of an acidulent to provide a final beverage pH of between about 2.5 and about 5.5, preferably from about 2.5 to about 5.0. The acidulent can comprise any edible acid capable of packaging in dry form. Among these are citric, malic, fumaric, adipic, and the like. These can be employed alone or in combination with a suitable buffer such as sodium or potassium citrate, malate or fumarate. While the level of acid will be largely a matter of taste, it will typically be present in an amount of from about 1 to 6 grams for each amount of mix for preparing 1 quart of beverage. It is also typical to employ carboxymethyl cellulose, ascorbic acid, mono-, di-, or tri-calcium orthophosphates for their beneficial effects upon powder handling, taste and nutrition.

The flavorant, like the colorant, is essential to the preparation of the beverage composition, but is employed in forms and amounts as are determined by organoleptic responses. Typical of the flavors employed are cola, root beer, orange, cherry, raspberry, lemon-lime, black cherry, lemonade, water-melon, grapefruit, grape and the like. Where flavors containing oxidizable oils or other sensitive components are employed, it is desirable to suitably protect these components by encapsulation using known techniques, such as in the form of extruded flavors such as those sold under the trademark Durarome commercially available from Mutual Citrus Products.

The sweetener, if used, may be any of the known non-toxic natural sweeteners. Of the natural sweeteners, sucrose is preferred; however, other sugars such as fructose, dextrose, etc.; certain alcohols such as sorbitol, mannitol, and xylitol; vegetable extracts such as ammoniated glycyrrhizen and the like, can be employed. Where sucrose is employed, it is preferably granulated with a particle size of 20 mesh (U.S. Standard). A nonnutritive, synthetic sweetener, such as saccharin, a cyclamate or salts thereof, can be used in the unsweetened beverage mix if an artifically sweetened beverage is desired for medical or dietary reasons. Dipeptide sweeteners and other oligopeptide sweeteners such as di- and tri-peptides of the acidic and nonbasic amino acids are not suitable sweeteners in the instant invention.

Where it is intended to employ granular sucrose in the dry beverage tablet, the sucrose is blended with the acidulent and the colorant as a part of the uniform dry mix. The resulting dry mix is then admixed with the aqueous moistener.

Typically, the aqueous moistener that is used to moisten the dry mix is added in an amount which is from about 2% to 15% of the weight of the dry mix. When glycerine or glycerine derivatives are employed, the amount of glycerine product will comprise from about 10% to 80% of the weight of water in the corn syrup which in addition to water contains from about 70% to about 85% soluble solids. A preferred high maltose corn syrup will be products such as those sold under the trademark Staley #7300, manufactured by A. E. Staley Manufacturing Company, Decatur, Ill. and containing about 30% water, 70% soluble solids, and having a DE value of about 50. The amount of aqueous moistener employed should be sufficient to produce a dough tough enough to stall (at speed 1) a standard 5-quart Hobart mixer in the case of the sugar-sweetened tablet.

The amount of particulate sucrose in the dry mix influences the fluid demand level of the tabletable mix. To be sure of proper tableting of the mixture, the amount of glycerine product or corn syrup is adjusted accordingly. Preferably, the relative amount of glycerine product within the moistener will increase proportionally to the amount of corn syrup when the aqueous moistener comprises both corn syrup and glycerine.

Where granular sucrose is added to the acidulent and colorant in the dry mix, the dough formed with the aqueous moistener is mixed until a noticeable increase in viscosity is achieved. Mixing should be terminated before the mixture starts to become dry and crumbly. Thus, it is preferred to maintain agitation of the admixture of the dry mix with the aqueous moistener until the torque required for mixing reaches at least 80% of its maximum value, and it is also preferred to terminate mixing prior to reaching this maximum. Where the resulting dough is too moist, it is difficult to control tablet density and yet minimize the degree of voids larger than mere interstitial spaces. Where the product has become dry due to overmixing, the resulting tablet will show an excessive number of such voids and be crumbly.

Prior to forming the sucrose-sweetened composition into tablets, a dextrinized starch material is dispersed throughout the moistened dough to form a flowable composition. The dextrinized starch material may have a Dextrose Equivalent (DE) value of between 0.5 and 50; however, it is preferred to employ a tapioca dextrin having a DE value of from about 3.5 to 6.0, or other functionally equivalent materials which have the ability of converting the dough into a substantially free-flowing granular material. The dextrinized starch material is preferably added gradually at a rate effective to assure its uniform dispersion within the dough. The flavorant and other minor ingredients should also be added prior to forming the composition into tablets. The addition of a dextrinized starch material and other minor ingredients can be simultaneous or sequential.

The process described above for preparing a sucrose-sweetened tablet can be modified to prepare a dry beverage composition tablet containing no sweetener or a synthetic sweetener. The aqueous moistener consisting of corn syrup and glycerine is added in an amount which is from about 2% to 15% of the weight of the dry, unsweetened mix. However, for the unsweetened or synthetically-sweetened tablet, the amount of glycerine added is from about 4% to 80% of the weight of the water in the corn syrup, preferably 25% by weight. The aqueous moistener is admixed with the dry ingredients to form a cohesive powder.

The preferred dextrinized starch materials for unsweetened or synthetically-sweetened beverage tablets are malto dextrins having DE values of below 15. A sufficient amount of malto dextrin is preferably added to the moistened particulate starting mix (a cohesive powder) at a rate effective to assure its uniform dispersion throughout the cohesive powder. All ingredients are then mixed to the point where a low bulk density powder is formed. Malto dextrins serve multiple functions in the preparation of an unsweetened beverage tablet. First, it acts as a binding agent in the formation of a cohesive tablet. Second, it elevates the melting point of the tabletable mixture so that the formed tablet does not melt during the optional drying step. Third, it functions as a disintegrator, increasing the rate at which the finished tablet dissolves in water.

In the unsweetened tablet, the minor amounts of dextrinized starch material, corn syrup and glycerine present do not provide any significant degree of sweetness.

The low bulk density powder in the case of an unsweetened or synthetically-sweetened mix is ready for tableting. The beverage mix sweetened with a natural sweetener is in the form of a granular, substantially free-flowing powder before tableting. Each of the resulting powders, prior to tableting, is referred to herein as a flowable composition.

The flowable composition (e.g., sweetened or unsweetened) has a moisture content in the range of 0.4 to 4.5 percent, preferably between 1-2 percent before tableting. The flowable composition is then compressed into coherent tablets of the desired size having a tablet density, after drying, of from about 0.7 to about 1.0 grams per cubic centimeter (g/cc). The desired degree of compression is determined by the volume occupied by a pre-determined weight of material to obtain desired density. Final tablet density is one of the critical parameters of this invention. If the tablet density is below 0.5 g/cc, the structural strength of the tablet is less than what is commercially desired. If the tablet density exceeds 1.0 g/cc, the solubility rate in water is greatly reduced. Thus, the optimum tablet density, after drying, is between 0.7 to 1.0 g/cc.

The final tablet density is achieved by using relatively low pressures, e.g. below 200 psig. It has been found that pressures of from about 15 to 150 psig, preferably from about 25 to 60 psig are employed with acceptable results.

For the best results with tablets containing flavorant and sugar, it is desirable to dry the compressed tablet to a stable moisture content of less than about 1.5% by weight to prevent deterioration of the tablet on storage. Thus, a flowable composition comprising flavorant and sugar that has a moisture content greater than about 1.5% should be dried.

This can be accomplished at any temperature effective to achieve drying within a reasonable period of time. Typically, drying can be accomplished at a temperature of around 60° C. for a period of about 15 to 30 minutes. Any other non-degrading conditions of time and temperature can also be employed. The drying step is also a heating/cooling step which converts the soft tablet into a strong, tough tablet. The process is analagous to a heat set.

The final tablet will appear to be essentially free of voids much larger than the normal interstitial distances obtained by compressing the mixture. The use of the aqueous moistener in combination with the dextrinized starch material, according to the process, enables the virtual elimination of the larger sized voids while not causing such a high degree of compaction that the solubility of the resulting tablet will be unduly decreased. Preferably, the tablets according to the present invention, will totally disintegrate in less than about 20, most preferably 10, seconds in water containing ice at 3° C. Complete dissolution of the composition will normally take place within less than one minute under moderate agitation.

For certain product applications, it is desired to provide a glazed surface on the tablet. This glaze can be prepared to seal the surface of the tablet and prevent minor amounts of beverage forming material from being easily removed. In the case of the unsweetened beverage tablets, it is more important to prevent this crumbling than in the case of the sweetened beverage mix because of the high concentration of flavor and coloring materials which if removed from the tablet and accumulated on a counter top or table cloth will result in not only a significant loss of beverage concentrate, but also may create an unsightly situation and an immediate need for cleaning. This could be a cause for great inconvenience in a product intended for convenience use. To obtain this glazed coating, a tablet as prepared above is contacted with steam or an otherwise moist atmosphere which will cause surface wetting of the tablet. This wetted surface is then dried to achieve the final glaze. In one particular embodiment, a saturated water vapor from water boiling at atmospheric pressure and 100° C. is brought into contact with unsweetened beverage tablets for from about 2 to about 10 seconds to result in a glaze due to a pickup of moisture on the order of from about 3.5 to about 5% by weight. The resulting product is then dried under normal conditions to achieve the glazed effect.

The following examples are presented for the purpose of further illustrating and explaining the present invention and are not to be taken as limiting in any regard. Unless otherwise indicated, all parts and percentages are by weight.

EXAMPLE 1

Sucrose-Sweetened Beverage Tablet

This example describes the preparation of a sweetened beverage formulation from the following materials.

| Ingredient | Parts by Weight |
| --- | --- |
| Granulated sucrose | 700 |
| Citric acid | 24 |
| FDA Red #40 colorant | 0.5 |
| Corn syrup (Staley #7300) | 50 |
| Fruit punch flavor | 5.4 |
| Beverage cloud | 3 |
| Carboxymethyl cellulose (high viscosity) | 3 |
| Ascorbic acid | 0.3 |
| Tricalcium Phosphate | 3.5 |
| 3.5-5 DE Tapioca dextrin (AE Staley #950SR) | 24 |

The granulated sucrose, citric acid, and red colorant are premixed for about 3 minutes in a five quart Hobart mixer using a mixing paddle and speed #1. The resulting uniform mix is maintained in this mixer wherein it is admixed with the aqueous moistener (corn syrup), the corn syrup being heated to a temperature of about 80° C. The corn syrup is added over a period of about 10 seconds and the resulting admixture is then mixed for about three and one-half minutes to assure a uniform tough dough. The mixer at this point is laboring as the solution is now uniformly dispersed over the surface of the solids in the dry mix. Mixing is terminated prior to any significant drying at which time the dough tends to become dry and crumbly. To the resulting dough, the tapioca dextrin and the remaining ingredients are added over a period of about 10 seconds and mixing is continued for an additional minute to convert the dough into a substantially free-flowing granular material. The granules appear as moist agglomerates having diameters of from about 1 to about 5 millimeters. The mix also contains a scattering of moist, soft balls. The bulk density of this substantially free-flowing granular material is about 0.5-0.8 grams per cubic centimeter. About 107 grams of this granular material is poured into a 9.5 centimeters diameter die which has a 2.7 centimeter concentric center punch. After leveling, a top punch is put in place and the work is moved to a Carver press and is pressed to a thickness of 2.1 centimeters. This typically takes a pressure of 30 to 60 psig (2.1-4.2 Kg/cm$_2$), depending upon the alignment of the top punch. The tablet is removed from the die and dried at 60° C. for 30 minutes. After cooling to room temperature, the tablet density is measured and found to be about 0.9 grams per cubic centimeter. The tablet is then packaged in a container constructed of fiber board side walls coated with a foil moisture barrier and having crimped metal end walls to assure protection. The product shows good storage stability, and when placed in a pitcher containing one quart of water and ice, disintegrates in 10 seconds and dissolves in about 1 minute with moderate stirring.

EXAMPLE 2

Unsweetened Beverage Tablet

According to this example, an attractive, highly-colored, circular unsweetened beverage mix tablet according to the present invention, is prepared from the following ingredients:

| Ingredient | Parts by Weight |
| --- | --- |
| Citric acid - Miles fine grind | 600 |
| Green colorant | 2.35 |
| Glycerine | 1.2 |
| Corn syrup (CPC Globe #1632) | 61.8 |
| Lemon flavor | 22 |
| Lime flavor | 20 |
| Malto dextrin (Mor Rex 1918) | 100 |
| Ascorbic acid | 15 |

The citric acid and one part of the green colorant are premixed for 3 minutes in a 5-quart Hobart mixer using a mixing spade at speed #1. To this uniform dry mix, a solution containing the glycerine and corn syrup at a temperature of about 80° C., is added over a period of about 10 seconds and mixed for an additional two minutes until the admixture becomes uniformly moistened. A second pre-mix is then prepared containing the flavorants, 25 parts of the malto dextrin, the ascorbic acid and the remaining 1.35 parts of the green colorant. One half of this second pre-mix is then added to the cohesive mix and mixed for 15 seconds. The other half of the second pre-mix is then added and mixed for an additional 30 seconds. After this period of time, the remaining 75 parts of the malto dextrin are added gradually over a period of about 1 minute and the resulting mixture is then mixed for 1 minute more. To form a tablet suitable for preparing 2 quarts of beverage, 7 grams of this resulting mixture are added to a 3.2 centimeter diameter die and pressed with light pressure of 15 to 50 psig to a thickness of 1.1 centimeters. The resulting tablets are placed on a U.S. #14 Standard mesh screen and held 6 inches above a pan of simmering water for about 3 seconds. The steam wets the surface of the tablets to provide a glazing which forms a skin over the tablet. The tablet is then dried at a temperature of about 60° C. for 30 minutes to reduce the moisture content of about 0.1%. The resulting tablets formed in this manner have a brightly-colored, non-crumbly appearance making them visually attractive and suitable for packaging in bubble pack materials. Preferably, the clear plastic bubble portion will be prepared from a suitable plastic polymer and the backing will be prepared with moisture barrier materials. After drying, the density of the tablet is about 0.9 grams per cubic centimeter. To prepare a beverage from a tablet made in this manner, the tablet is added to 2 quarts of water containing ice along with one cup of granulated sucrose and mixed until dissolved. The tablet is completely disintegrated within 20 seconds and completely dissolved in a minute.

EXAMPLE 3

Synthetically-Sweetened Beverage Tablet

Using the procedure described above in Example 2, a synthetically-sweetened beverage tablet is prepared with citric acid, green colorant and saccharin to form a uniform dry mix. The resulting tablet is mixed with 2 quarts of water containing ice and is completely dissolved in about one minute.

EXAMPLE 4

Soluble Acidulent Tablet

A nonfriable, rapidly water-soluble tablet is prepared from the following materials:

| Ingredient | Grams |
| --- | --- |
| Citric acid (anhydrous) | 580 |
| Malic acid (anhydrous) | 70 |
| Aqueous moistener* | 56 |
| Corn syrup solids (powdered) | 55 |
| 3.5-5 DE Tapioca dextrin (AE Staley #950SR) | 25 |
| Calcium sulfate (Sno-white, trademark of U.S. Gypsum) | 20 |

*Composition by weight of aqueous moistener is 100 parts corn syrup (CPC Globe #1632 trademark of Corn Products Company), 1 part glycerine and 1 part water.

The granulated, anhydrous citric and malic acids are mixed for about 3 minutes in a five quart Hobart mixer using a mixing paddle and speed #1. The resulting uniform, dry mix is maintained in this mixer wherein it is admixed with the aqueous moistener, the moistener being heated to a temperature of about 94-99° C. The aqueous moistener is added over a period of about 10 seconds and the resuling admixture is then mixed for about four minutes. After four minutes the mass is compacted and clears the bowl. The powdered corn syrup solids are sprinkled in over a 1 minute period to begin drying and segregation. After 1½ minutes, the powdered tapioca dextrin is tapped in for further segregation and granulation to small balls. After three minutes, the calcium sulfate is tapped in to finish drying and granulation. The resulting mixture is then mixed for two minutes in the Hobart mixer at speed #1 to provide a flowable composition that is transportable and compressible. In a manner similar to that described in Example 1, 23 grams of the flowable composition is placed in a punch-and-die, beveled-edge table press and pressed to a thickness of 18 millimeters. Compression pressures are in the range of 15 to 60 psig. The tablet has good resiliency, sufficient resistance to impact and abrasion and completely disintegrates in 20-45 seconds when contacted with an aqueous medium.

EXAMPLE 5

Effect of Moisture Content and Tableting Pressure on Tablet Performance

Using the tablet formulations of Examples 1 and 2, specific variations in moisture content of the flowable composition and specific variations in tableting pressure are indicated in Table I below. The corresponding effect of the specific variations on structural strength and rate of dissolution in water for each tablet is also noted in Table I. The tablets of Example 1 are designated SST (Sugar Sweetened Tablet), the tablets of Example 2 are designated UST (Unsweetened Tablet). The tablets contain the same proportion of ingredients given in the respective Examples, except for the variations listed.

TABLE I

EFFECT OF MOISTURE CONTENT AND TABLETING PRESSURE ON TABLETS OF THIS INVENTION

| Tablet No. | Moisture Content (%) | Tableting Pressure psig | Dissolution Time in water (seconds) | Strength of Tablet |
|---|---|---|---|---|
| SST-1 | 0.9 | 55 | 9 | good |
| SST-2 | 2.4 | 55 | 18 | very good |
| SST-3 | 1.5 | 15 | 5 | good |
| SST-4 | 1.5 | 55 | 15 | very good |
| SST-5 | 1.5 | 110 | 26 | very good |
| UST-1 | 2.5 | 1 | no tablet formed | very poor |
| UST-2 | 2.5 | 10 | weak crumbly tablet | poor |
| UST-3 | 2.5 | 20 | 14 | good |

These data confirm that an acceptable range of the moisture content of the flowable mixture to be tableted is between about 1–2.5%. However, it has been found that when no sugars are present a preferred moisture content is in the range of 2.5–4.5% weight basis of the flowable mixture. The greater mositure content gives a stronger sugar-sweetened tablet which dissolves at a slower rate when placed in an aqueous medium. With regard to pressure variations, as pressure increases the tablet dissolution time increases as does the structural integrity of the tablet. What was completely surprising and unexpected was the degree of tablet toughness that could be achieved with such relatively low pressures. A rating of good and very good structural strength is given to each tablet that can satisfactorily withstand shipping and handling in normal commerical distribution channels without breaking and crumbling.

The above description is for the purpose of teaching the person skilled in the art how to practice the present invention. This description is not intended to detail all of the obvious modifications and variations of the invention which will become apparent to the skilled worker upon reading. However, applicant does intend to include all such obvious modifications and variations within the scope of his invention which is defined by the following claims.

What is claimed is:

1. An improved process for preparing a non-friable, rapidly water-soluble tablet, said tablet comprises an edible acidulent and is prepared by compressing a moistened mixture of dry components, wherein the process comprises the steps of:
   (a) preparing a uniform dry mix comprising an acidulant;
   (b) admixing an aqueous moistener comprising corn syrup with the dry mix wherein the amount of moistener is between 2% to 15% of the dry weight of the mix;
   (c) adding a sufficient amount of a hydrolyzed starch material to function as a melting point elevator and also to convert the mixture of step (b) into a free-flowing granular composition;
   (d) compressing the flowable composition of step (c) to the extent necessary to obtain a coherent tablet which has a tablet density of from 0.7 to 1.0 grams per cubic centimeter, as measured on a tablet having a moisture content of less than about 1.5% by weight; and
   (e) drying the tablet to a stable moisture content of less than 1.5%.

2. The process of claim 1 wherein the pressure used in step (d) for compressing the free flowing granular composition of step (c) to obtain a coherent tablet is from about 15–150 psig.

3. The process of claim 2 wherein the pressure is from about 25–60 psig.

4. The process of claim 1 wherein the flowable composition of step (c) has a moisture content in the range of 0.4 to 4.5 percent weight basis.

5. The process of claim 1 wherein a flavor and colorant are dispersed throughout the free-flowing granular composition of step (c).

6. The process of claim 1 wherein the aqueous moistener of step (b) contains glycerine.

7. The process of claim 1 wherein the aqueous moistener is added in an amount which is from 2 to 15% weight basis of the uniform dry mix.

8. The process of claim 6 wherein the amount of glycerine is from 4 to 80% of the weight of the water in the corn syrup.

9. The process of claim 1 wherein the dextrinized starch material comprises a hydrolyzed starch having a DE of from about 0.5 to about 50.

10. The process of claim 1 wherein the hydrolyzed starch material is present in an amount effective to convert the mixture of step (c) into a substantially free-flowing granular material.

11. The process of claim 1 wherein sucrose is blended with the acidulent and the colorant in forming the uniform dry mix.

12. The process of claim 11 wherein the mixture comprising sucrose, acidulent, color, and corn syrup is mixed until the viscosity of the free-flowable material reaches at least 80% of its maximum value, and mixing is thereafter terminated.

13. The process of claim 12 wherein the starch material comprises a dextrinized tapioca starch having a DE of from about 3.5 to about 6.

14. The process of claim 13 wherein the dextrinized tapioca starch is added in an amount effective to convert the material of step (c) into a substantially free-flowing granular material.

15. The process of claim 6 wherein the hydrolyzed starch material is a dextrin.

16. The process of claim 15 wherein the amount of glycerine is from about 10 to 20% of the weight of the water in the corn syrup.

17. The process of claim 15 wherein the uniform dry mix comprises a synthetic sweetener selected from the group consisting of a saccharin, a cyclamate, salts thereof and mixtures thereof.

18. The process of claim 1 wherein the edible acidulent is citric acid.

19. The process of claim 1 wherein the tablet is exposed to wet steam for a period of time effective to moisten the surface and provide a glazed surface upon drying.

20. A product produced according to the process of claim 1, 15 or 18.

* * * * *